United States Patent
Cho et al.

(10) Patent No.: US 7,240,502 B2
(45) Date of Patent: Jul. 10, 2007

(54) METHOD FOR CONTROLLING OPERATION OF AIR-CONDITIONER

(75) Inventors: Eun-Jun Cho, Gimpo-Si (KR); Yoon-Jei Hwang, Seoul (KR); Yun-Ho Ryu, Seoul (KR); Cheol-Min Kim, Anyang-Si (KR); Chan-Ho Song, Gwacheon-Si (KR); Chang-Min Choi, Seoul (KR); Ji-Young Jang, Seongnam-Si (KR); Young-Seob Choi, Seoul (KR); Woo-Ho Cha, Seoul (KR); Seung-Youp Hyun, Seoul (KR); Won-Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 517 days.

(21) Appl. No.: 10/917,287

(22) Filed: Aug. 13, 2004

(65) Prior Publication Data

US 2005/0091998 A1    May 5, 2005

(30) Foreign Application Priority Data

Nov. 4, 2003    (KR)    ........... 10-2003-0077614

(51) Int. Cl.
  F25B 7/00    (2006.01)
  F25B 41/00    (2006.01)
  F25B 49/00    (2006.01)
(52) U.S. Cl. ............... 62/175; 62/193; 62/228.4; 62/228.5; 62/510
(58) Field of Classification Search ............ 62/175, 62/193, 228.4, 228.5, 197, 199, 470, 510
See application file for complete search history.

(56) References Cited

U.S. PATENT DOCUMENTS 4,876,859 A    10/1989    Kitamoto
5,050,397 A    9/1991    Sugiyama et al.
5,265,436 A    11/1993    Murata et al.
6,807,817 B2 *    10/2004    Lee et al. ............ 62/175
6,843,066 B2 *    1/2005    Lee et al. ............ 62/175

(Continued)

FOREIGN PATENT DOCUMENTS

EP    0410570    1/1991
EP    0543622    5/1993

(Continued)

OTHER PUBLICATIONS

English Language Abstract of JP 9-113035.
English Language Abstract of JP 5-157374.

Primary Examiner—Chen Wen Jiang
(74) Attorney, Agent, or Firm—Greenblum & Bernstein, P.L.C.

(57) ABSTRACT

A method for controlling operations of an air-conditioner includes: a step in which when an operation load of an air-conditioner increases, if an outputted compressing capacity of the air-conditioner is smaller than a compressing capacity corresponding to the operation load and an operation frequency of the first compressor is a maximum frequency of the first compressor, a second compressor is operated; and a step in which when the operation load is reduced, if the outputted compressing capacity of the air-conditioner is greater than the compressing capacity corresponding to the operation load and the operation frequency of the first compressor is a minimum frequency of the first compressor, the second compressor is stopped.

12 Claims, 7 Drawing Sheets

U.S. PATENT DOCUMENTS

| | | |
|---|---|---|
| 2002/0116938 A1 | 8/2002 | Uno et al. |
| 2003/0230097 A1 | 12/2003 | Moon et al. |
| 2003/0233837 A1 | 12/2003 | Lee et al. |
| 2003/0233838 A1 | 12/2003 | Lee et al. |

FOREIGN PATENT DOCUMENTS

| | | |
|---|---|---|
| EP | 1493978 | 1/2005 |
| JP | 5-157374 | 6/1993 |
| JP | 9-113035 | 5/1997 |

* cited by examiner

METHOD FOR CONTROLLING OPERATION OF AIR-CONDITIONER

BACKGROUND OF THE INVENTION

1. Field of the Invention

The present invention relates to an air-conditioner and, more particularly, to a method for controlling operations of an air-conditioner.

2. Description of the Background Art

In general, an air-conditioner is a device for conditioning a certain space to a temperature, humidity and air flow distribution suitable for humans' activity and cooling a room by using a principle of evaporation heat of taking ambient heat when a high temperature high pressure-compressed refrigerant is evaporated through various types of compressors to remove dust or the like in the air. As the refrigerant, a liquid that can be easily evaporated at a low temperature is used, and usually, a freon gas is used.

FIG. 1 is a block diagram showing the construction of a conventional air-conditioner.

As shown in FIG. 1, the conventional air-conditioner includes a controller 10 for measuring an indoor temperature and outputting a control signal for controlling a cooling capacity on the basis of the measured temperature and a pre-set temperature; a compressor 20 for compressing a refrigerant on the basis of the control signal; a condenser 30 for condensing the compressed refrigerant; an expansion valve 40 for expanding the condensed refrigerant; and an evaporator 50 for evaporating the expanded refrigerant.

An operational principle of the conventional air-conditioner will now be described.

First, the controller 10 measures an indoor temperature and outputs the control signal for controlling a cooling capacity on the basis of the measured indoor temperature and the temperature previously set by a user.

The compressor 20 includes a first compressor 21, a small capacity compressor, and a second compressor 22, a large capacity compressor. The first compressor 21 can vary a compression capacity to control a cooling capacity according to the control signal, and the second compressor 22 has a constant compression capacity. The second compressor 22 is a constant-speed compressor.

The first and second compressors 21 and 22 are selectively driven according to the control signal to compress the refrigerant to a high temperature high pressure. Namely, the compressor 20 operates in three types of modes: when only the first compressor is driven, only the second compressor is driven, and both first and second compressors are driven, to thereby change a compressing capacity of the refrigerant required for air-conditioning.

The range of controlling the cooling capacity differs depending on the types of the first and second compressors. The constant speed type compressor has a constant operation speed, so it controls an operation frequency an indoor temperature by being turned on/off. The inverter compressor is controlled in its operation speed, so it can control an indoor temperature relatively precisely by controlling an operation frequency.

For instance, if a compressing capacity of the air-conditioner is total 100, in which the first compressor 21 is an inverter compressor having a compressing capacity of 40 and the second compressor 22 is a constant-speed compressor having a compressing capacity of 60, an air-conditioner employing the first and second compressors can control indoor temperatures with compressing capacities of 10, 20, 30, 40, 50, 60, 70, 90 and 100 relatively precisely.

Recently, an air-conditioner employing 4 compressors is used. Its operation is the same as the compressor of FIG. 1, and capacities of compressors are 20, 20, 30 and 300 or the same compressors are used.

An air-conditioner employing two compressors will now be described as an example.

The condenser 30 condenses the refrigerant which has been compressed to a high temperature high pressure in the compressor 20, and the expansion valve 40 expands the condensed refrigerant. The evaporator 50 evaporates the expanded refrigerant, taking heat around it, whereby heat exchange is made that a temperature of air contacting with the surface of the evaporator 50.

The conventional air-conditioner having the inverter compressor and the constant-speed compressor is used to control a cooling capacity by using the inverter compressor and the constant-speed compressor, so that it can control the cooling capacity precisely according to air-conditioning operation load.

The method for controlling operations of the air-conditioner having the inverter compressor and the constant-speed compressor will now be described with reference to FIGS. 2A and 2B.

FIGS. 2A and 2B are a flow chart of the method for controlling operation of the air-conditioner having the inverter compressor and the constant-speed compressor in accordance with the conventional art.

As shown in FIGS. 2A and 2B, the method for controlling operations of conventional air-conditioner having the inverter compressor and the constant-speed compressor, including: a step (S21) in which whether an operation load of the air-conditioner is increased is determined; a step (S22) in which when the operation load is increased, an operation frequency of the inverter compressor is lowered to a minimum frequency of the inverter compressor and the constant-speed compressor is operated, and then, a compressing capacity of the air-conditioner is adjusted to be equal to a compressing capacity corresponding to the operation load by increasing the operation frequency of the inverter compressor in order to maintain a pre-set temperature; and a step (S23) in which when the operation load is reduced, the operation frequency of the inverter compressor is increased to a maximum frequency of the inverter compressor and the constant-speed compressor is stopped, and then, the compressing capacity of the air-conditioner is adjusted to be equal to the compressing capacity corresponding to the operation load by reducing the operation frequency of the inverter compressor in order to maintain the pre-set temperature.

The method for controlling operations of the air-conditioner having the inverter compressor and the constant-speed compressor in accordance with the conventional art will now be described in detail.

The conventional air-conditioner having the inverter compressor and the constant-speed compressor determines whether its operation load is increased (step S21). That is, the air-conditioner determines whether the operation load is increased by comparing its outputted compressing capacity and a compressing capacity corresponding to the operation load.

When the operation load is increased, the operation frequency of the inverter compressor is lowered to the minimum frequency of the inverter compressor and the constant-speed compressor is operated, and then, a compressing capacity output of the air-conditioner and the compressing capacity corresponding to the operation load are adjusted to be equal by increasing the operation frequency of the inverter compressor (step S22).

Namely, when the operation load of the inverter compressor is increased, the compressing capacity of the air-conditioner and the compressing capacity corresponding to the operation load of the inverter compressor are compared (step S22-2) while increasing the operation frequency of the inverter compressor (step S22-1). Herein, when the compressing capacity of the air-conditioner becomes equal to the compressing capacity corresponding to the operation load of the inverter compressor, the operation frequency which has been increased as much as a predetermined level is maintained as it is.

If, however, the outputted compressing capacity of the air-conditioner is different from the compressing capacity corresponding to the operation load of the inverter compressor, it is determined whether the operation frequency of the inverter compressor is the maximum frequency of the inverter compressor (step S22-3). If the operation frequency of the inverter compressor is the maximum frequency, the operation frequency of the inverter compressor is reduced to the minimum frequency (step S22-4), and then, the constant-speed compressor is operated (turned on) (step S22-5).

In the state that the constant-speed compressor is being operated after the operation frequency of the inverter compressor is reduced to the minimum frequency, the outputted compressing capacity of the air-conditioner is adjusted to be equal to the compressing capacity corresponding to the operation load while increasing the operation frequency of the inverter compressor by as much as certain levels (step S23). Namely, after the constant-speed compressor is operated, while the operation frequency of the inverter compressor is increased by as much as certain levels (step S23-1), the outputted compressing capacity of the air-conditioner is adjusted to be equal to the compressing capacity corresponding to the operation load (step S23-2).

Meanwhile, when the operation load is reduced, the operation frequency of the inverter compressor is increased to the maximum frequency of the inverter compressor and the constant-speed compressor is stopped, and then, the outputted compressing capacity of the air-conditioner is adjusted to be equal to the compressing capacity corresponding to the operation load by reducing the operation frequency of the inverter compressor (step S24).

Namely, when the operation load is reduced, while the operation frequency of the inverter compressor is being reduced by as much as certain levels (step S24-1), the outputted compressing capacity of the air-conditioner and the compressing capacity corresponding to the operation load are compared (step S24-2). If the two compressing capacities are equal, the operation frequency which has been increased as much as the certain level is maintained as it is.

If, however, the outputted compressing capacity of the air-conditioner is different from the compressing capacity corresponding to the operation load of the inverter compressor, it is determined whether the operation frequency of the inverter compressor is the minimum frequency (step S24-3). If the operation frequency of the inverter compressor is the minimum frequency, the operation frequency of the inverter compressor is increased to the maximum frequency (step S24-4). Thereafter, the constant-speed compressor is stopped (turned off) (step S24-5).

In the state that the constant-speed compressor is stopped after the operation frequency of the inverter compressor is increased to the maximum frequency, the outputted compressing capacity of the air-conditioner is adjusted to be equal to the compressing capacity corresponding to the operation load by increasing the operation frequency of the inverter compressor by as much as certain levels (step S25). After the constant-speed compressor is stopped, the outputted compressing capacity of the air-conditioner is adjusted to be equal to the compressing capacity corresponding to the operation load (step S25-2) by reducing the operation frequency of the inverter compressor by as much as certain levels (step S25-1).

Herein, the sum of the compressing capacity of the inverter compressor and the outputted compressing capacity of the constant-speed compressor, namely, the capability of varying the outputted compressing capacity of the air=conditioner to be equal to the compressing capacity corresponding to the operation load is called an operation load coping capability. Accordingly, it is ideal that the relation between the outputted compressing capacity of the air-conditioner and the compressing capacity corresponding to the operation load has a form of y=x graph.

However, the method for controlling operations of the air-conditioner having the inverter compressor and the constant-speed compressor in accordance with the conventional art has the following problems.

That is, in the process of switching from the inverter compressor to the constant-speed compressor, namely, when the constant-speed compressor is operated after the operation frequency of the inverter compressor is reduced to the initial frequency or when the constant-speed compressor is stopped after the operation frequency of the inverter compressor is increased to the maximum frequency, the compressing capacity of the operation load changes, so the compressing capacity of the air-conditioner fails to change accordingly to the compressing capacity corresponding to the operation load. Thus, the operation load coping capability, degrading refreshingness (agreeable atmosphere) in a room.

In addition, since the load of the air-conditioner is rapidly changed before and after the inverter compressor and the constant-speed compressor are switched, they cannot be stably switched.

SUMMARY OF THE INVENTION

Therefore, one object of the present invention is to provide a method for controlling operations of an air-conditioner capable of quickly coping with an operation load of an air-conditioner.

Another object of the present invention is to provide a method for controlling operations of an air-conditioner capable of stably switching from an inverter compressor to a constant-speed compressor.

To achieve these and other advantages and in accordance with the purpose of the present invention, as embodied and broadly described herein, there is provided a method for controlling operations of an air-conditioner including: a step in which when an operation load of an air-conditioner increases, if an outputted compressing capacity of the air-conditioner is smaller than a compressing capacity corresponding to the operation load and an operation frequency of the first compressor is a maximum frequency of the first compressor, the operation frequency of the first compressor is reduced and then when the operation frequency of the first compressor is higher than the minimum frequency of the first compressor, a second compressor is operated; and a step in which when the operation load is reduced, if the outputted compressing capacity of the air-conditioner is greater than the compressing capacity corresponding to the operation load and the operation frequency of the first compressor is a minimum frequency of the first compressor, the operation frequency of the first compressor is increased and then when the operation frequency of the first compressor is lower than the maximum frequency of the first compressor, the second compressor is stopped.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A method for controlling operations of an air-conditioner capable of quickly coping with an operation load of an air-conditioner and stably switching from an inverter compressor to a constant-speed compressor by differentiating points of operation (ON) and stopping (OFF) of the constant-speed compressor, in accordance with a preferred embodiment of the present invention will now be described.

Figure 1:
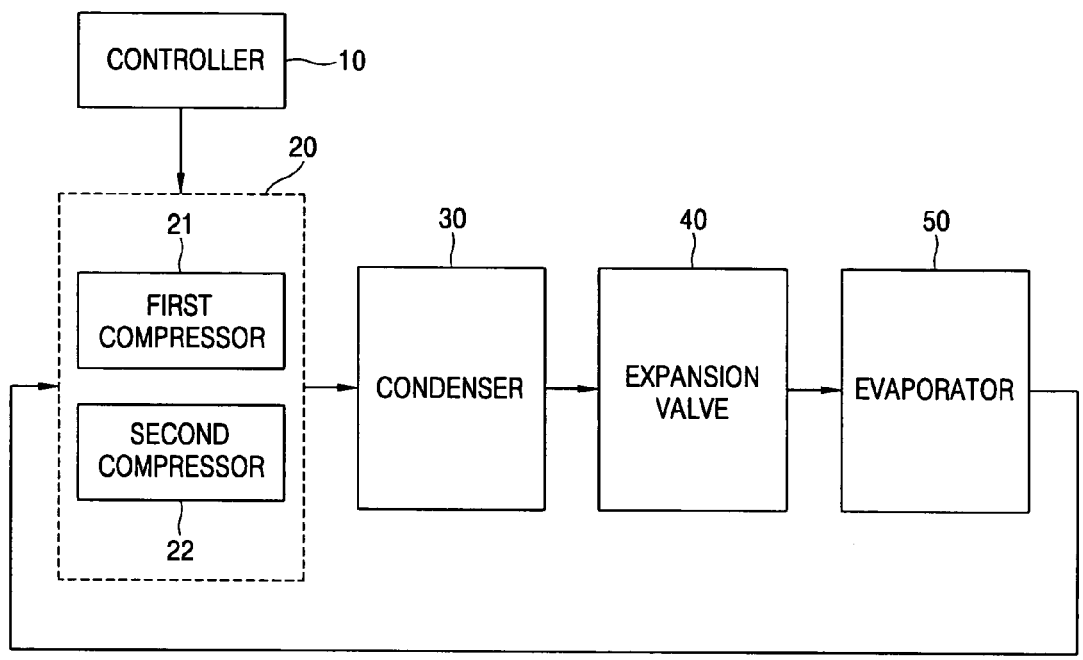
FIG. 1 is a block diagram showing the construction of an air-conditioner having an inverter compressor and a constant-speed compressor in accordance with a conventional art.
Figure 2A:
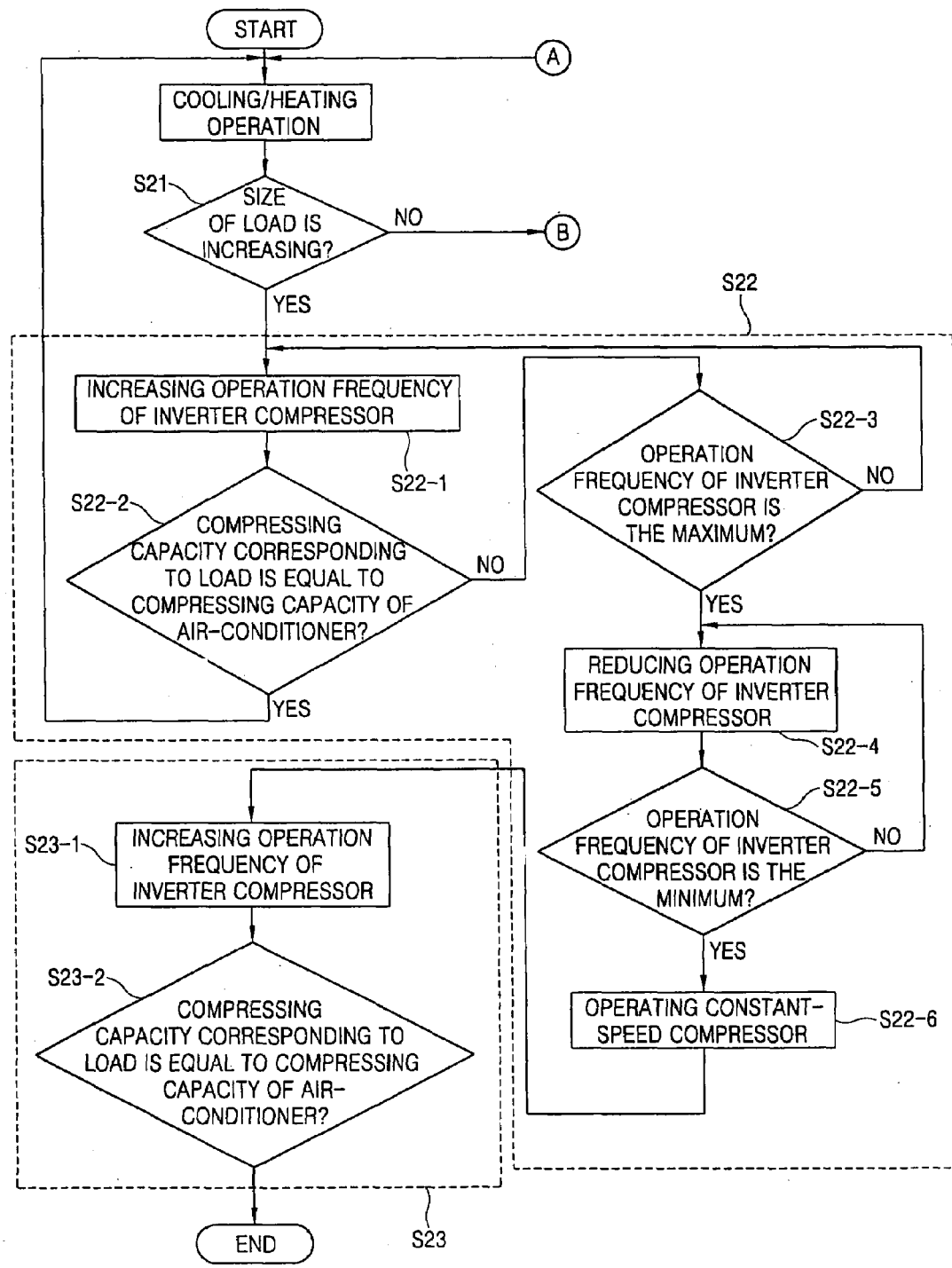
FIGS. 2A and 2B are flow charts of a method for controlling operations of the air-conditioner having the inverter compressor and the constant-speed compressor in accordance with the conventional art.
Figure 2B:
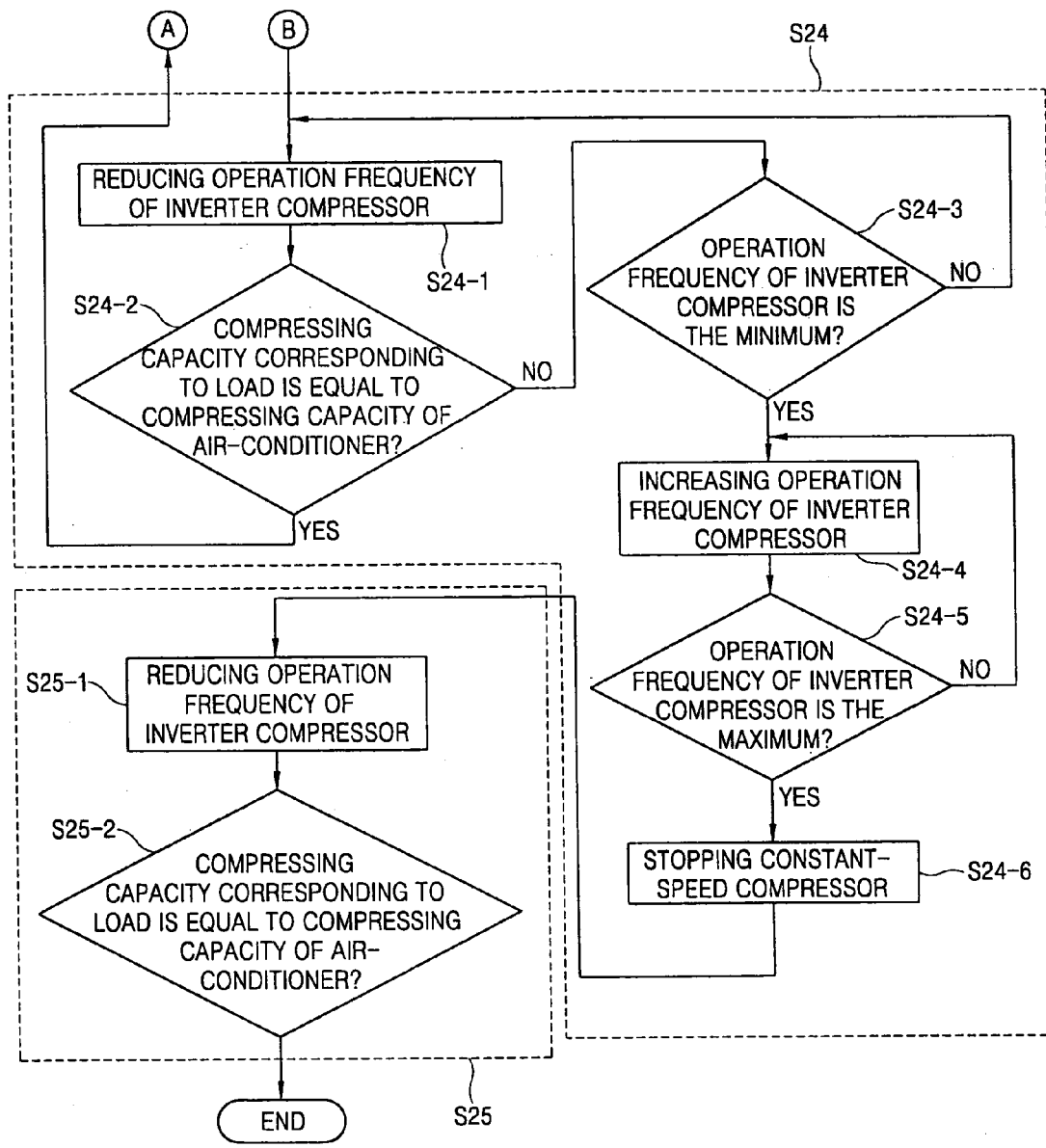
Figure 3A:
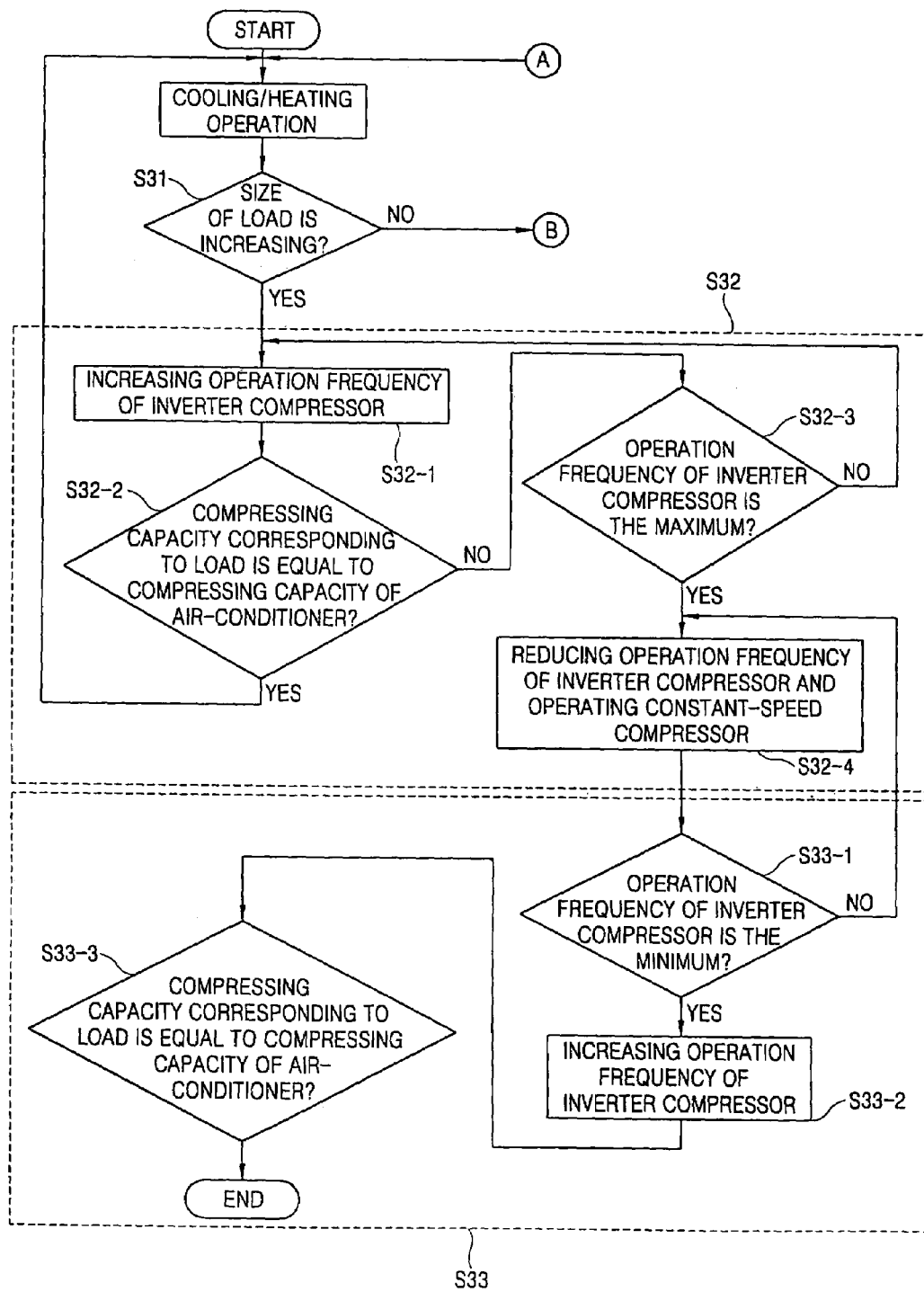
FIGS. 3A and 3B are flow charts of a method for controlling operations of an air-conditioner in accordance with the present invention.
Figure 3B:
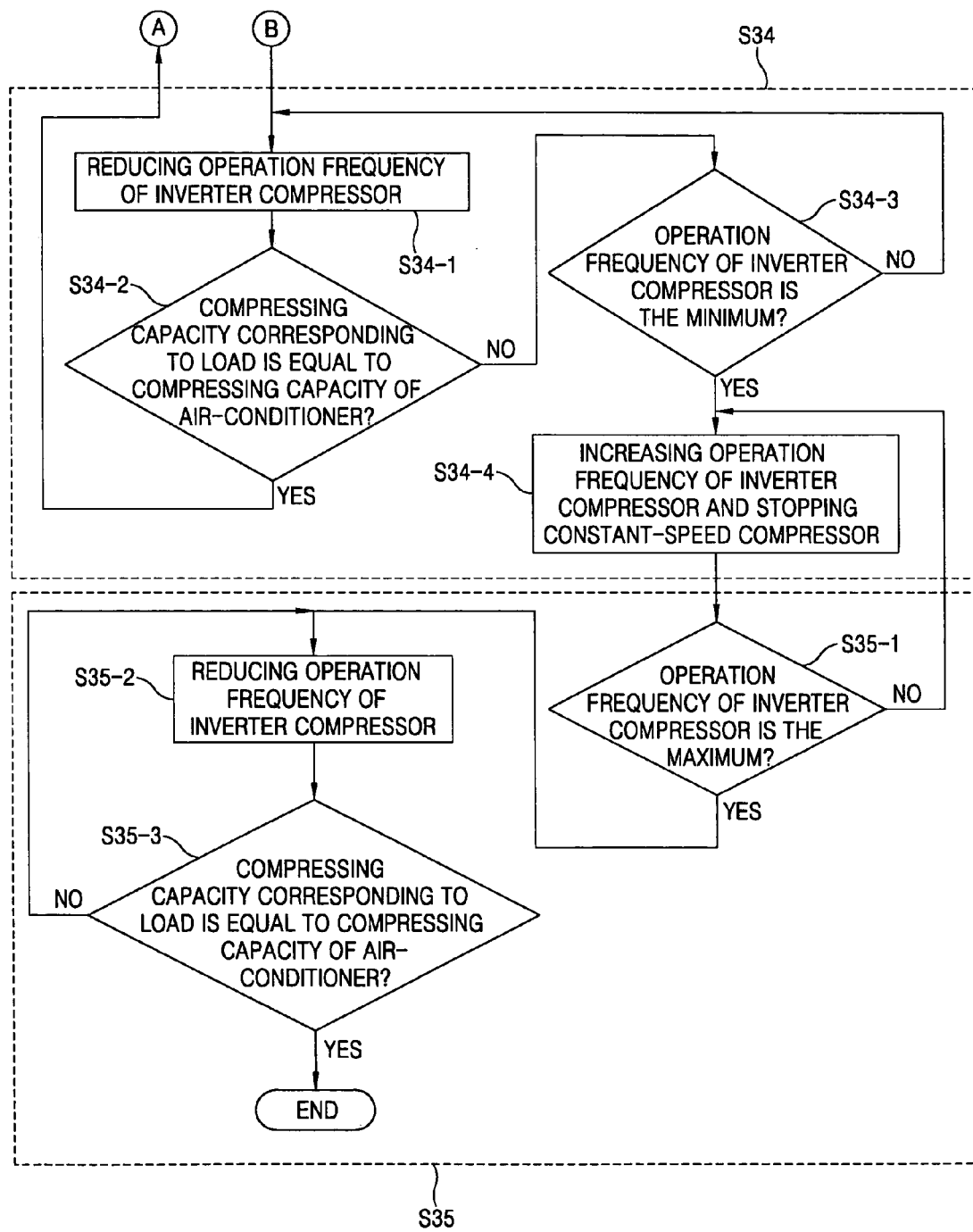

FIGS. 3A and 3B are a flow chart of a method for controlling operations of an air-conditioner in accordance with the present invention.

As shown in FIGS. 3A and 3B, the method for controlling operations of an air-conditioner in accordance with the present invention includes: a step in which when an operation load of an air-conditioner is increased, if an outputted compressing capacity of the air-conditioner is smaller than a compressing capacity corresponding to the operation load and an operation frequency of a first compressor is a maximum frequency of the first compressor, the operation frequency of the first compressor is reduced, and then, when the operation frequency of the first compressor is greater than the minimum frequency of the first compressor, a second compressor is operated; and a step in which when the operation load is reduced, if the outputted compressing capacity of the air-conditioner is greater than the compressing capacity corresponding to the operation load and the operation frequency of the first compressor is the minimum frequency of the first compressor, the operation frequency of the first compressor is increased, and then, when the operation frequency of the first compressor is smaller than the maximum frequency of the first compressor, the second compressor is stopped.

The method for controlling operations of the air-conditioner in accordance with a preferred embodiment of the present invention will now be described, in which the first compressor is an inverter compressor and the second compressor is a constant-speed compressor.

First, in case that an operation load of the air-conditioner is increased (step S31), if an outputted compressing capacity of the air-conditioner is smaller than the compressing capacity corresponding to the operation load and the operation frequency of the first compressor is the maximum frequency of the first compressor, the operation frequency of the first compressor is reduced, and then, when the operation frequency of the first compressor is greater than the minimum frequency of the first compressor, the second compressor is operated (ON) (step S32).

In other words, when the operation load of the air-conditioner is increased, while the operation frequency of the inverter compressor is being increased by as much as a certain level (step S32-1), the sum of the increased compressing capacity of the inverter compressor and the compressing capacity of the constant-speed compressor, that is, the outputted compressing capacity of the air-conditioner, is compared with the compressing capacity of the operation load (step S32-2). If the outputted compressing capacity of the air-conditioner is equal to the compressing capacity corresponding to the operation load, the operation frequency of the inverter compressor which has been increased by the certain level is maintained as it is.

If, however, the outputted compressing capacity of the air-conditioner is different from the compressing capacity corresponding to the operation load, it is determined whether the increased operation frequency of the inverter compressor is the maximum frequency of the inverter compressor (step S32-2). If the operation frequency of the inverter compressor is the maximum frequency of the inverter compressor, the operation frequency of the inverter compressor is reduced, and then, before the operation frequency of the inverter compressor becomes the minimum frequency of the inverter compressor, the constant-speed compressor is operated (ON) (step S32-4).

Substantially, since the constant-speed compressor is not an ideal compressor, when the constant-speed compressor is operated (ON), it does not immediately outputs a compressing capacity but requires a certain time. Namely, the constant-speed compressor has a transition state.

Thus, preferably, after the constant-speed compressor is operated, the outputted compressing capacity of the air-conditioner is adjusted to be equal to the compressing capacity corresponding to the operation load during the transition state while the operation frequency of the inverter compressor is reduced.

After the constant-speed compressor is operated, the outputting compressing capacity of the air-conditioner is adjusted to be equal to the compressing capacity corresponding to the operation load by increasing the operation frequency of the inverter compressor, which has been lowered down to the minimum frequency, by as much as certain levels (step S33).

Namely, after the constant-speed compressor is operated, it is determined whether the operation frequency of the inverter compressor is the minimum frequency (step S33-1). If the operation frequency of the inverter compressor is the minimum frequency, while the operation frequency of the inverter compressor is increasing by as much as certain levels (step S33-2), the outputted compressing capacity of the air-conditioner is compared with the compressing capacity corresponding to the operation load to adjust the compressing capacity of the air-conditioner to be equal to the compressing capacity corresponding to the operation load (step S33-3).

Meanwhile, in case that an operation load of the air-conditioner is reduced (step S32), if an outputted compressing capacity of the air-conditioner is greater than the compressing capacity corresponding to the operation load and the operation frequency of the first compressor is the minimum frequency of the first compressor, the operation frequency of the first compressor is increased, and then, when the operation frequency of the first compressor is smaller than the maximum frequency of the first compressor, the second compressor is stopped (ON) (step S34).

In other words, in case that the operation load of the air-conditioner is reduced, while the operation frequency of the inverter compressor is being increased by as much as a certain level (step S34-1), the sum of the reduced compressing capacity of the inverter compressor and the compressing capacity of the constant-speed compressor, that is, the outputted compressing capacity of the air-conditioner, is compared with the compressing capacity of the operation load (step S34-2). If the outputted compressing capacity of the air-conditioner is equal to the compressing capacity corresponding to the operation load, the operation frequency of the inverter compressor which has been reduced by the certain level is maintained as it is.

If, however, the outputted compressing capacity of the air-conditioner is different from the compressing capacity corresponding to the operation load, it is determined whether the reduced operation frequency of the inverter compressor is the minimum frequency of the inverter compressor (step S34-3). If the operation frequency of the inverter compressor is the minimum frequency of the inverter compressor, the operation frequency of the inverter compressor is increased, and then, when the operation frequency of the inverter compressor is smaller than the maximum frequency of the inverter compressor, the constant-speed compressor is stopped (OFF) (step S34-4).

Substantially, since the constant-speed compressor is not an ideal compressor, when the constant-speed compressor is stopped (OFF), an output of the constant-speed compressor does not become '0' but a certain time is required. Namely, the constant-speed compressor has a transition state.

Thus, preferably, after the constant-speed compressor is stopped, the outputted compressing capacity of the air-conditioner is adjusted to be equal to the compressing capacity corresponding to the operation load during the transition state while the operation frequency of the inverter compressor is increased.

After the constant-speed compressor is stopped, the outputting compressing capacity of the air-conditioner is adjusted to be equal to the compressing capacity corresponding to the operation load by increasing the operation frequency of the inverter compressor, which has been increased up to the maximum frequency, by as much as certain levels (step S35).

Namely, after the constant-speed compressor is stopped, it is determined whether the operation frequency of the inverter compressor is the maximum frequency (step S35-1). If the operation frequency of the inverter compressor is the maximum frequency, while the operation frequency of the inverter compressor is being reduced by as much as certain levels (step S35-2), the outputted compressing capacity of the air-conditioner is compared with the compressing capacity corresponding to the operation load to adjust the compressing capacity of the air-conditioner to be equal to the compressing capacity corresponding to the operation load (step S35-3).

The load coping capability according to the method for controlling operations of the air-conditioner in accordance with the present invention will now be described with reference to FIGS. 4A–4C and 5A–5C.

FIGS. 4 4A–4C are graphs showing a load coping capability of the air-conditioner when a load is increased in accordance with the present invention, and FIG. 5 is a graph showing a load coping capability of the air-conditioner when a load is reduced in accordance with the present invention.

With reference to FIGS. 4A–4C and 5A–5C, shaded portions indicate that the air-conditioner fails to cope with the load, 'T' is a point where the constant-speed compressor is operated or stopped in the conventional art, and 't' is a point where the constant-speed compressor is operated or stopped in the present invention, a portion expressed as a dotted line is a graph in accordance with the conventional art, and a portion expressed as a solid line is a graph in accordance with the present invention.

Figure 4A:
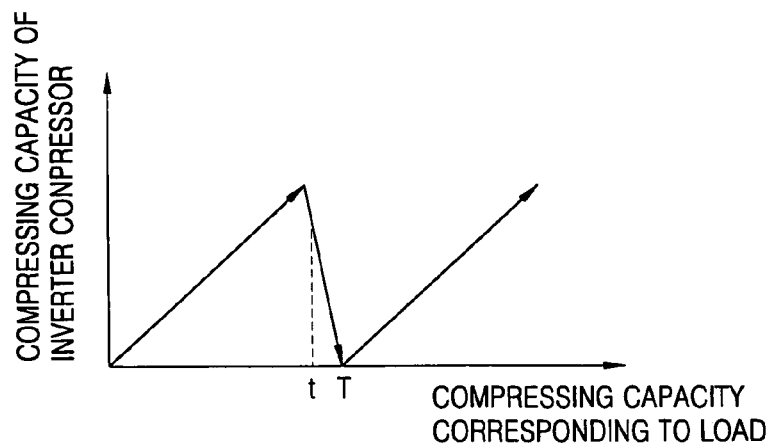
FIGS. 4A–4C are graphs showing a load coping capability of the air-conditioner when a load is increased in accordance with the present invention.
Figure 4B:
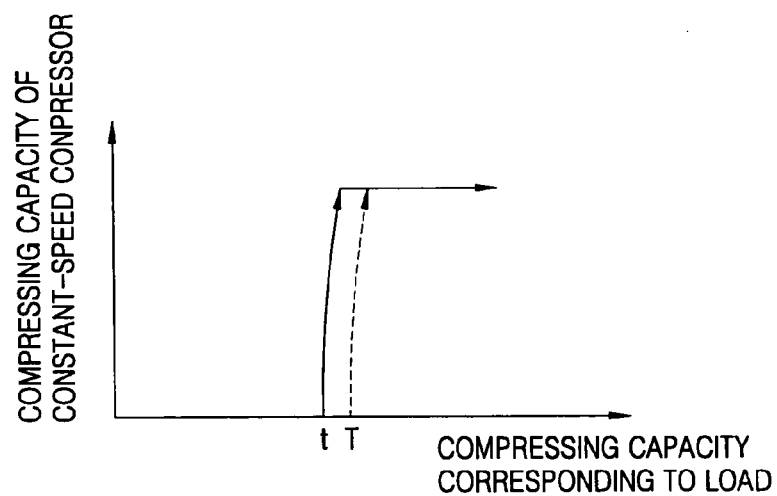
Figure 4C:
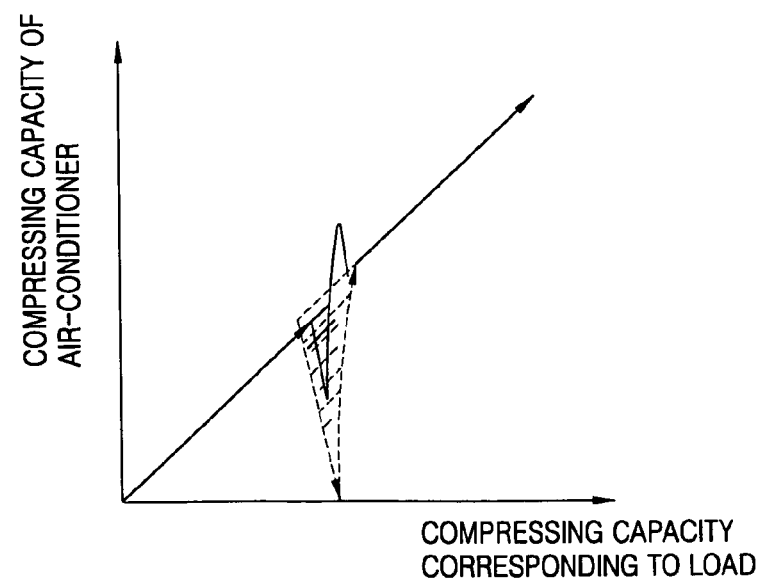

As shown in FIGS. 4A–4C, when the compressing capacity corresponding to the operation load is greater than the compressing capacity of the air-conditioner outputted when the operation frequency of the inverter compressor is the maximum frequency, there is a certain time interval in the processing of switching from the inverter compressor to the constant-speed compressor, there occurs a time interval during which the air-conditioner cannot cope with the load.

Figure 5A:
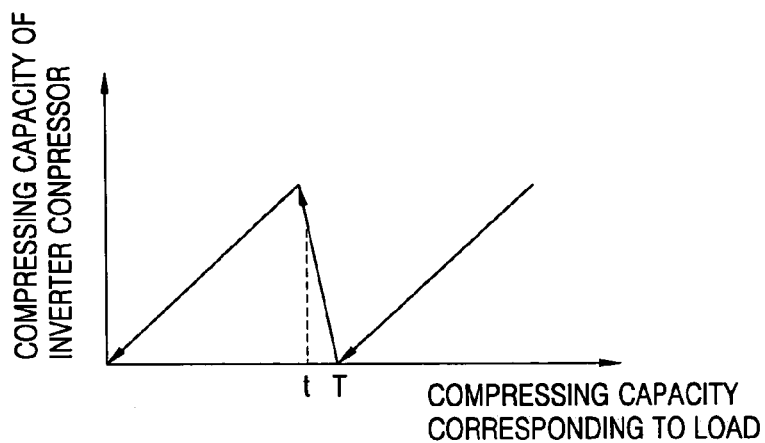
FIGS. 5A–5C are graphs showing a load coping capability of the air-conditioner when a load is reduced in accordance with the present invention.
Figure 5B:
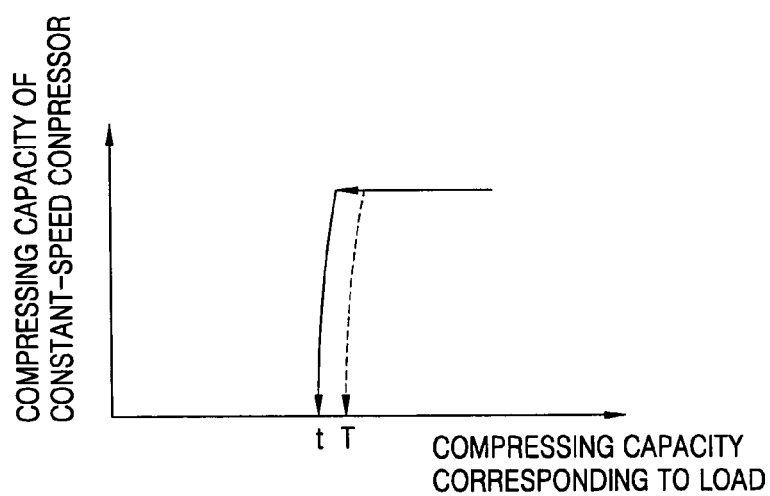
Figure 5C:
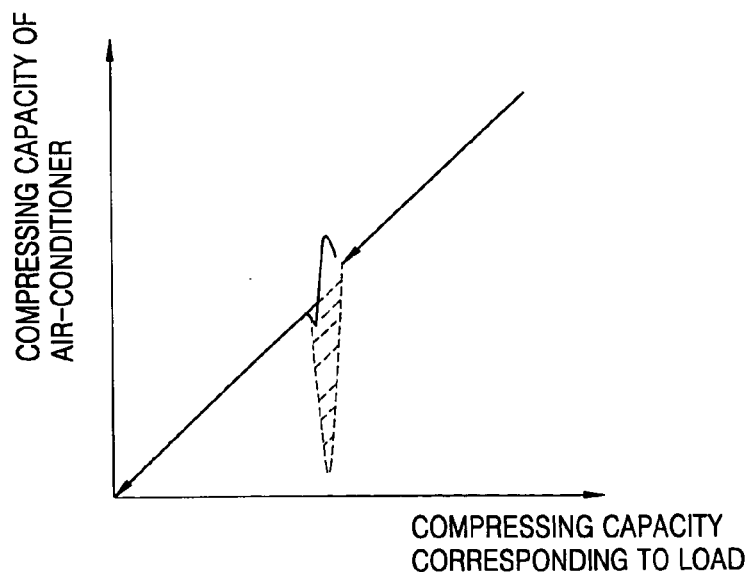

As shown in FIGS. 5A–5C, when the compressing capacity corresponding to the operation load is smaller than the compressing capacity of the air-conditioner outputted when the operation frequency of the inverter compressor is the minimum frequency, there is a certain time interval in the processing of switching from the inverter compressor to the constant-speed compressor, there occurs a time interval during which the air-conditioner cannot cope with the load.

However, in the method for controlling operations of the air-conditioner in accordance with the present invention, the air-conditioner quickly cope with the load, the time interval (term) is much reduced, and thus, refreshingness is enhanced.

In addition, in the method for controlling operations of the air-conditioner having the inverter compressor and the constant-speed compressor, because there is no rapid change in the load before and after a point where the inverter compressor is switched to the constant-speed compressor, the compressors can be stably switched.

In comparison, referred to the conventional method for controlling operations of the air-conditioner having the inverter compressor and the constant-speed compressor, since the air-conditioner cannot quickly cope with the load, the time interval during which the air-conditioner is to cope with the load is long, degrading refreshingness or an agreeable atmosphere.

In addition, since the load of the air-conditioner is rapidly changed before and after a point where the inverter compressor and the constant-speed compressor are switched, the compressors cannot be stably switched.

As so far described, the method for controlling operations of the air-conditioner having the inverter compressor and the constant-speed compressor in accordance with the present invention has the following advantages.

That is, for example, first, when the inverter compressor is switched to the constant-speed compressor in order to cope with an operation load of the air-conditioner, the points when the constant-speed compressor is operation (ON) or stopped (OFF) is differentiated from those in the conventional art, so that the air-conditioner can quickly cope with the operation load. In addition, the inverter compressor can be stably switched to the constant-speed compressor.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling operations of an air-conditioner comprising:
    a step in which when an operation load of an air-conditioner increases, if an outputted compressing capacity of the air-conditioner is smaller than a compressing capacity corresponding to the operation load and an operation frequency of the first compressor is a maximum frequency of the first compressor, the operation frequency of the first compressor is reduced and then when the operation frequency of the first compressor is higher than the minimum frequency of the first compressor, a second compressor is operated; and
    a step in which when the operation load is reduced, if the outputted compressing capacity of the air-conditioner is greater than the compressing capacity corresponding to the operation load and the operation frequency of the first compressor is a minimum frequency of the first compressor, the operation frequency of the first compressor is increased and then when the operation frequency of the first compressor is lower than the maximum frequency of the first compressor, the second compressor is stopped.

2. The method of claim 1, wherein the first compressor is an inverter compressor and the second compressor is a constant-speed compressor.

3. The method of claim 1, wherein when the operation load is increased, the second compressor is operated, and in a transition state during which the operation frequency of the first compressor is reduced, the outputted compressing capacity of the air-conditioner is adjusted to be equal to the compressing capacity corresponding to the operation load.

4. The method of claim 1, wherein when the operation load is reduced, the second compressor is stopped, and in a transition state during which the operation frequency of the first compressor is increased, the outputted compressing capacity of the air-conditioner is adjusted to be equal to the compressing capacity corresponding to the operation load.

5. The method of claim 1, further comprising:
    a step in which when the operation load is increased, the second compressor is operated, and the outputted compressing capacity of the air-conditioner outputted while increasing the operation frequency of the first compressor is adjusted to be equal to the compressing capacity corresponding to the operation load.

6. The method of claim 1, further comprising:
    a step in which when the operation load is reduced, the second compressor is stopped, and the outputted compressing capacity of the air-conditioner outputted while increasing the operation frequency of the first compressor is adjusted to be equal to the compressing capacity corresponding to the operation load.

7. A method for controlling operations of an air-conditioner comprising:
    a step in which when an operation load of an air-conditioner is increased, if an outputted compressing capacity of the air-conditioner is smaller than a compressing capacity corresponding to the operation load and an operation frequency of an inverter compressor is a maximum frequency of the inverter compressor, the operation frequency of the inverter compressor is reduced and then when the operation frequency of the inverter compressor is higher than the minimum frequency of the inverter compressor, a constant-speed compressor is operated;
    a step in which when the operation load is increased, the constant-speed compressor is operated and while the operation frequency of the inverter compressor is being increased, the outputted compressing capacity of the air-conditioner is adjusted to be equal to the compressing capacity corresponding to the operation load;
    a step in which when the operation load is reduced, if the outputted compressing capacity of the air-conditioner is greater than the compressing capacity corresponding to the operation load and the operation frequency of the first compressor is the minimum frequency of the first compressor, the operation frequency of the inverter compressor is increased and then when the operation frequency of the inverter compressor is smaller than the maximum frequency of the inverter compressor, the constant-speed compressor is stopped; and
    a step in which when the operation load is reduced, the constant-speed compressor is stopped and while the operation frequency of the inverter compressor is being reduced, the outputted compressing capacity of the air-conditioner is adjusted to be equal to the compressing capacity corresponding to the operation load.

8. A method for controlling operations of a compressor comprising:
    a step in which when an operation load of compressors is increased, if an outputted compressing capacity of the air-conditioner is smaller than a compressing capacity corresponding to the operation load and an operation frequency of a first compressor is a maximum frequency of the first compressor, the operation frequency of the first compressor is reduced, and then, when the operation frequency of the first compressor is greater than the minimum frequency of the first compressor, a second compressor is operated; and
    a step in which when the operation load is reduced, if the outputted compressing capacity of compressors is greater than the compressing capacity corresponding to the operation load and the operation frequency of the first compressor is the minimum frequency of the first compressor, the operation frequency of the first compressor is increased, and then, when the operation frequency of the first compressor is smaller than the maximum frequency of the first compressor, the second compressor is stopped.

9. The method of claim 8, further comprising:
a step in which when the operation load is increased, the second compressor is operated, and during a transition state while the operation frequency of the first compressor is being reduced, the outputted compressing capacity of the compressors is adjusted to be equal to the compressing capacity corresponding to the operation load.

10. The method of claim 8, further comprising:
a step in which when the operation load is reduced, the second compressor is stopped, and during a transition state while the operation frequency of the first compressor is being increased, the outputted compressing capacity of the compressors is adjusted to be equal to the compressing capacity corresponding to the operation load.

11. The method of claim 8, further comprising:
a step in which when the operation load is increased, the second compressor is operated, and then while the operation frequency of the first compressor is being increased, the outputted compressing capacity of the compressors is adjusted to be equal to the compressing capacity corresponding to the operation load.

12. The method of claim 8, further comprising:
a step in which when the operation load is reduced, the second compressor is stopped, and then while the operation frequency of the first compressor is being reduced, the outputted compressing capacity of the compressors is adjusted to be equal to the compressing capacity corresponding to the operation load.

* * * * *